(12) United States Patent
Siddiqui

(10) Patent No.: US 7,203,467 B2
(45) Date of Patent: Apr. 10, 2007

(54) PROTECTIVE CASE FOR ELECTRONICS IN A MOBILE DEVICE

(75) Inventor: Kabir Siddiqui, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 492 days.

(21) Appl. No.: 10/413,908

(22) Filed: Apr. 14, 2003

(65) Prior Publication Data

US 2004/0204025 A1 Oct. 14, 2004

(51) Int. Cl.
*H04B 1/38* (2006.01)

(52) U.S. Cl. ............... 455/90.3; 455/575.8; 455/575.1; 455/575.4; 455/550.1; 379/446; 379/455; 379/433.07

(58) Field of Classification Search ............. 455/90.3, 455/550.1, 575.1, 575.3, 575.4, 575.8; 379/446, 379/455, 433.07
See application file for complete search history.

(56) References Cited

U.S. PATENT DOCUMENTS

| | | | | |
|---|---|---|---|---|
| 4,912,602 | A * | 3/1990 | Zurek et al. ................. | 361/752 |
| 5,146,615 | A * | 9/1992 | Hodsdon et al. ........... | 455/90.3 |
| 5,257,310 | A * | 10/1993 | Takagi et al. .......... | 379/433.13 |
| 5,271,056 | A * | 12/1993 | Pesola et al. ............. | 455/575.1 |
| 5,768,370 | A * | 6/1998 | Maatta et al. .......... | 379/433.01 |
| 5,819,163 | A * | 10/1998 | Tsukamoto et al. ....... | 455/575.1 |
| 5,966,652 | A * | 10/1999 | Coad et al. .............. | 455/412.1 |
| 6,081,595 | A * | 6/2000 | Picaud ........................ | 379/446 |
| 6,101,372 | A * | 8/2000 | Kubo ......................... | 455/558 |
| 6,141,417 | A * | 10/2000 | Lopez et al. ................. | 379/446 |
| 6,192,255 | B1 * | 2/2001 | Lewis et al. ................. | 455/558 |
| 6,212,372 | B1 * | 4/2001 | Julin .......................... | 455/418 |
| 6,377,685 | B1 * | 4/2002 | Krishnan ............... | 379/433.07 |
| 6,463,263 | B1 * | 10/2002 | Feilner et al. ............. | 455/90.1 |
| 6,477,274 | B1 * | 11/2002 | Kim et al. .................. | 382/187 |
| 6,546,265 | B1 * | 4/2003 | Okuda ...................... | 455/575.1 |
| 6,594,472 | B1 * | 7/2003 | Curtis et al. ............. | 455/575.8 |
| 6,692,275 | B2 * | 2/2004 | Lee ............................ | 439/165 |
| 6,892,081 | B1 * | 5/2005 | Elomaa .................... | 455/575.1 |
| 6,904,300 | B1 * | 6/2005 | Maattanen et al. ...... | 455/575.1 |

OTHER PUBLICATIONS

*Shock Absorbing Honeycomb*; (Brief Article); Paperboard Packaging, vol. 86, No. 2, Feb. 1, 2001; p. 47.

Lisa M. Bouchey; *Targus*; (Product Information); Office Solutions, Vo. 18, No. 5, May 1, 2001; p. 50.

(Continued)

*Primary Examiner*—Marceau Milord
(74) *Attorney, Agent, or Firm*—Merchant & Gould P.C.; Ryan T. Grace

(57) ABSTRACT

A mobile device contains a case to rigidly secure and protect components of the mobile device, especially against large shock forces that can occur when the mobile device is dropped. The case is typically formed using a material that is generally rigid, lightweight (i.e., less dense), and relatively inexpensive, such as magnesium. The case further comprises rigid sidewalls that surround the peripheral edges of the device display. The sidewalls are arranged to protect the display by absorbing incidental shock forces. The case further comprises a surface is configured as a platform to receive a keypad. The surface is arranged to prevent forces from being transmitted from the keypad to an internal print circuit board, which provides protection against the internal printed circuit board from being flexed to the point of failure. The mobile device may further comprise a boot that is slidably coupled to the frame.

20 Claims, 5 Drawing Sheets

OTHER PUBLICATIONS

Sonya A. Donaldson; *Palm Holder*; Black Enterprise, vol. 32, No. 5, Dec. 1, 2001; p. 58.

Virginia Sutcliffe; *Computer Case*; (Pelican Product) (Brief Article); Occupational Hazards, vol. 61, No. 10, Oct. 1, 1999; p. 200.

Virginia Sutcliffe; *Computer Case*; (Pelican) (Brief Article); Occupational Hazards, vol. 61, No. 6, Jun. 1, 1999; p. 99.

Virginia Sutcliffe; *Computer Case*; (Pelican Products Company, Inc., Parr Inc.) (Brief Article) (Product Announcement); Occupational Hazards, vol. 61, No. 3, Mar. 1, 1999; p. 86.

*InnoPocket Launches the Ultra Rugged TiPro (TM) Titanium Hard Case Line for HP's iPAQ h5000, h4100, h2200, and hl900 Series Pocket PC and PalmOne Tungsten T3 and T2*; PR Newswire; Jan. 6, 2004.

*Kensington Takes the Pain Out of Mobile Computing, Introduces First Truly Ergonomic Laptop Case for Professionals; New SkyRunner Countour Computer Case, Designed by Ergonomic Experts, Helps Reduce Stress and Fatigue with Unique Innovations, Including Sculpted Hip Panel and Shock-Absorbing Strap*; PR Newswire; Mar. 25, 2003.

*Dow Delivers Customised Foam Technology*; Asian Plastics News; Sep. 1999; p. 57.

\* cited by examiner

PROTECTIVE CASE FOR ELECTRONICS IN A MOBILE DEVICE

BACKGROUND OF THE INVENTION

Small, mobile computing devices such as personal desktop assistants, including hand-held and pocket-sized computers, tablet personal computers and the like, are becoming important and popular user tools. In general, they have become small enough to be extremely convenient, while consuming less battery power, and at the same time have become capable of running more powerful applications.

However, the shrinking size of these devices creates reliability problems for the cases and packaging used for these devices. For example, the reduced size of cases may allow the case to bend, buckle, or twist if the device comprising the case is dropped. This problem can cause intermittent functionality of, for example, the display or keypad of the device. In more extreme cases, the display or the keypad could be permanently damaged, which can lead to denial of service and/or expensive replacement or repair.

SUMMARY OF THE INVENTION

The present invention is directed towards a mobile device comprising a case for rigidly securing and protecting components of the mobile device, especially against large shock forces that can occur when the mobile device is dropped. The case is typically formed using a material that is generally rigid, lightweight (i.e., less dense), and relatively inexpensive, such as magnesium. The case comprises rigid sidewalls that surround the peripheral edges of the device display. The sidewalls are arranged to protect the display by absorbing incidental shock forces. The case further comprises a surface that is configured as a platform to receive a keypad. The surface is arranged to prevent forces from being transmitted from the keypad to an internal print circuit board, which provides protection against the internal printed circuit board from being flexed to the point of failure. The mobile device may further comprise a boot that is slidably coupled to the frame.

DETAILED DESCRIPTION OF THE INVENTION

Briefly stated, the present invention is directed towards a mobile device comprising a case for rigidly securing and protecting components of the mobile device, especially against large shock forces that can occur when the mobile device is dropped. The case is typically formed using a material that is generally rigid, lightweight (i.e., less dense), and relatively inexpensive, such as magnesium. The case comprises rigid sidewalls that surround the peripheral edges of the device display. The sidewalls are arranged to protect the display by absorbing incidental shock forces. The case further comprises a surface that is configured as a platform to receive a keypad. The surface is arranged to prevent forces from being transmitted from the keypad to an internal print circuit board, which provides protection against the internal printed circuit board from being flexed to the point of failure. The mobile device may further comprise a boot that is slidably coupled to the frame.

Illustrative Operating Environment

Figure 1:
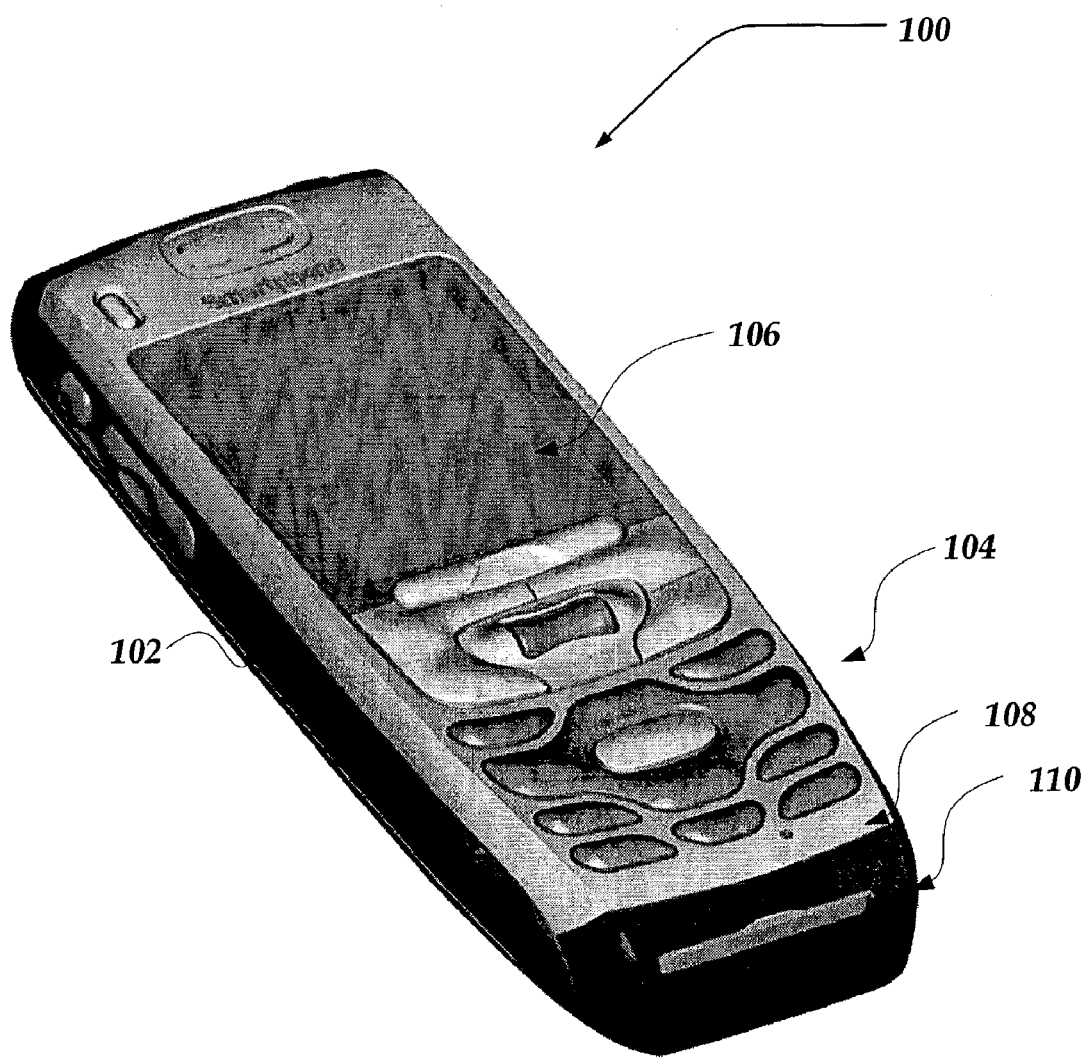
FIG. 1 shows an illustration of an exemplary mobile device in accordance with the present invention.

FIG. 1 shows an illustration of an exemplary mobile device in accordance with the present invention. Mobile device 100 may include many more or less components than those shown. The components shown, however, are sufficient to disclose an illustrative embodiment for practicing the invention. Mobile device 100 includes case 102. Case 102 typically is arranged to support and protect user interface instrumentalities such as keypad 104 and display 106. Keypad 104 is often programmable and can be used for functions such as text input, game functions, phone dialing, and the like. Display 106 may optionally contain a touch screen interface, which can also be used for input of text. Display 106 may be used to display maps, text, games, pictures, and the like. Fascia 108 typically overlies keypad 104 and display 106 and can be used to display legends for buttons, brand names, and the like. Boot 110 can be extended outwards from case 102, which can be used to release keypad 104 and fascia 108 for replacement. Keypad 104 and fascia 108 can be customized for different applications such as game playing, text entry, phone dialing, and the like.

Generally, mobile device 100 may include virtually any portable computing device capable of receiving and transmitting signals between another mobile device, and providing audio signals, such as ringer tones, and the like. Such devices include cellular telephones, smart phones, audio pagers, radio frequency (RF) devices, infrared (IR) devices, integrated devices combining one or more of the preceding devices, and the like. Mobile device 100 may also include other devices, such as Personal Digital Assistants (PDA) with audio functions, handheld computers, wearable computers, and the like. As such, mobile device 100 typically ranges widely in terms of capabilities and features.

Figure 2:
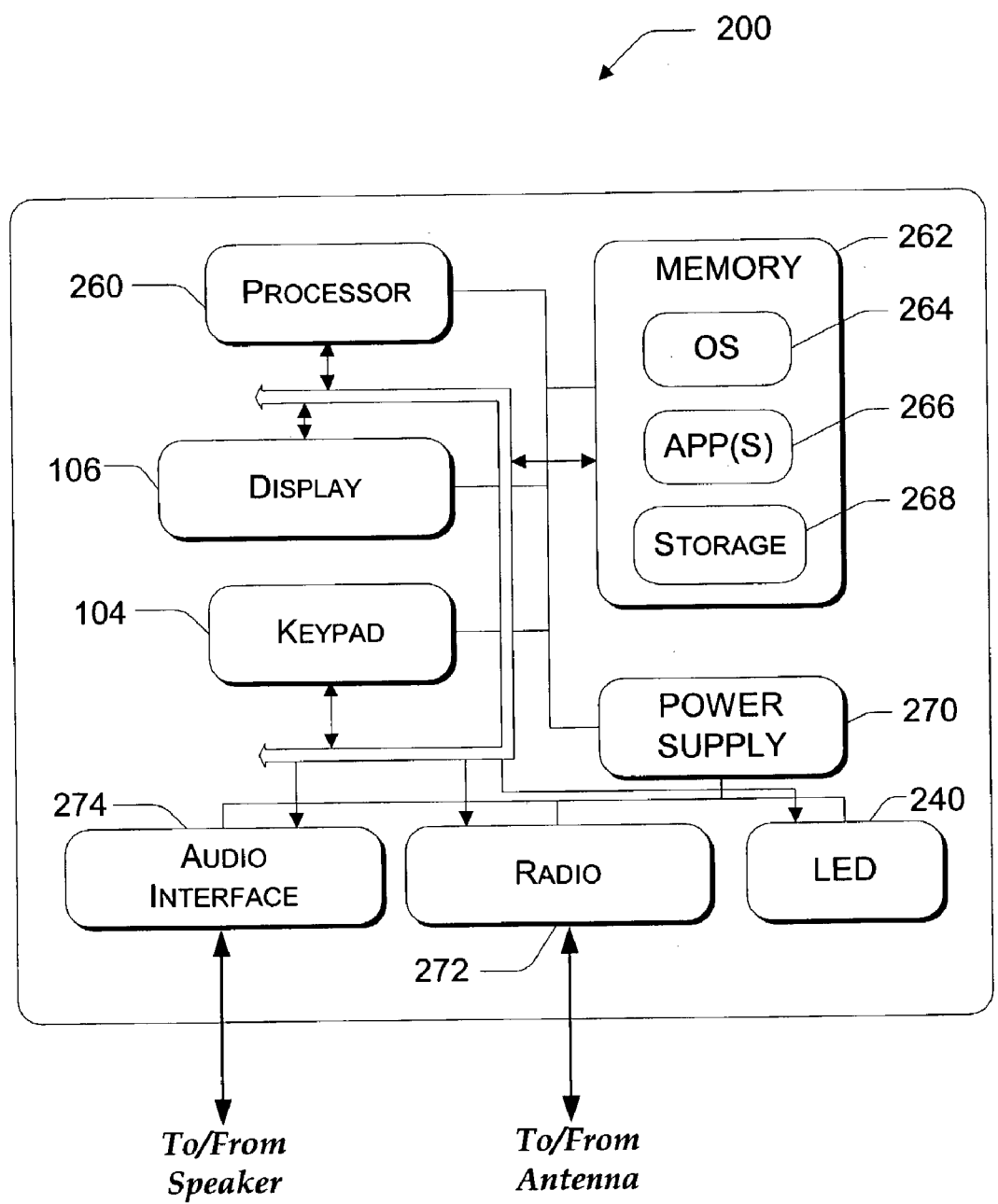
FIG. 2 is a functional block diagram illustrating an embodiment of components for use in an example mobile device in accordance with the present invention.

FIG. 2 is a functional block diagram illustrating an embodiment of components for use in an example mobile device in accordance with the present invention. Components 200 may include many more or less components than those shown. The components shown, however, are sufficient to disclose an illustrative embodiment for practicing the invention.

As shown in the figure, components 200 include processor 260, memory 262, display 106, and keypad 104. Memory 262 generally includes both volatile memory (e.g., RAM) and non-volatile memory (e.g., ROM, Flash Memory, or the like). Components 200 may include an operating system 264, such as the Windows CE operating system from Microsoft Corporation or other such operating system, which is resident in memory 262 and executes on processor 260. Keypad 104 may be a push button numeric dialing pad (such as on a typical telephone), a game pad, or the like. Display 106 may be a liquid crystal display, or any other type of display commonly used in a mobile communications device. For example, display 106 may be touch-sensitive, and would then also act as an input device.

One or more application programs 266 may be loaded into memory 262 and run on operating system 264. Examples of application programs include phone dialer programs, email programs, user ringer tone selection programs, and so forth. Components 200 also include non-volatile storage 268 within memory 262. Non-volatile storage 268 may be used to store persistent information which should not be lost if the mobile device 100 is powered down. The application programs 266 may use and store information in storage 268, such as e-mail, user selectable ringer tones, and the like.

Components 200 also include power supply 270, which may be implemented as one or more batteries. Power supply 270 might further include an external power source, such as an AC adapter or a powered docking cradle that supplements or recharges the batteries.

Components 200 are also shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output. Audio interface 274 may also be coupled to a microphone, receiving speaker, or the like, for receiving audible input, such as to facilitate a telephone conversation.

Components 200 also include radio 272 that performs the function of transmitting and receiving radio frequency communications. Radio 272 may be coupled to an antenna. Radio 272 facilitates wireless connectivity between components 200 and the outside world, via a communications carrier or service provider. Transmissions to and from radio 272 are conducted under the control of operating system 264 such that communications received by radio 272 may be disseminated to application programs 266 via operating system 264, and vice versa.

Radio 272 allows components 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

General Structure

Figure 3:
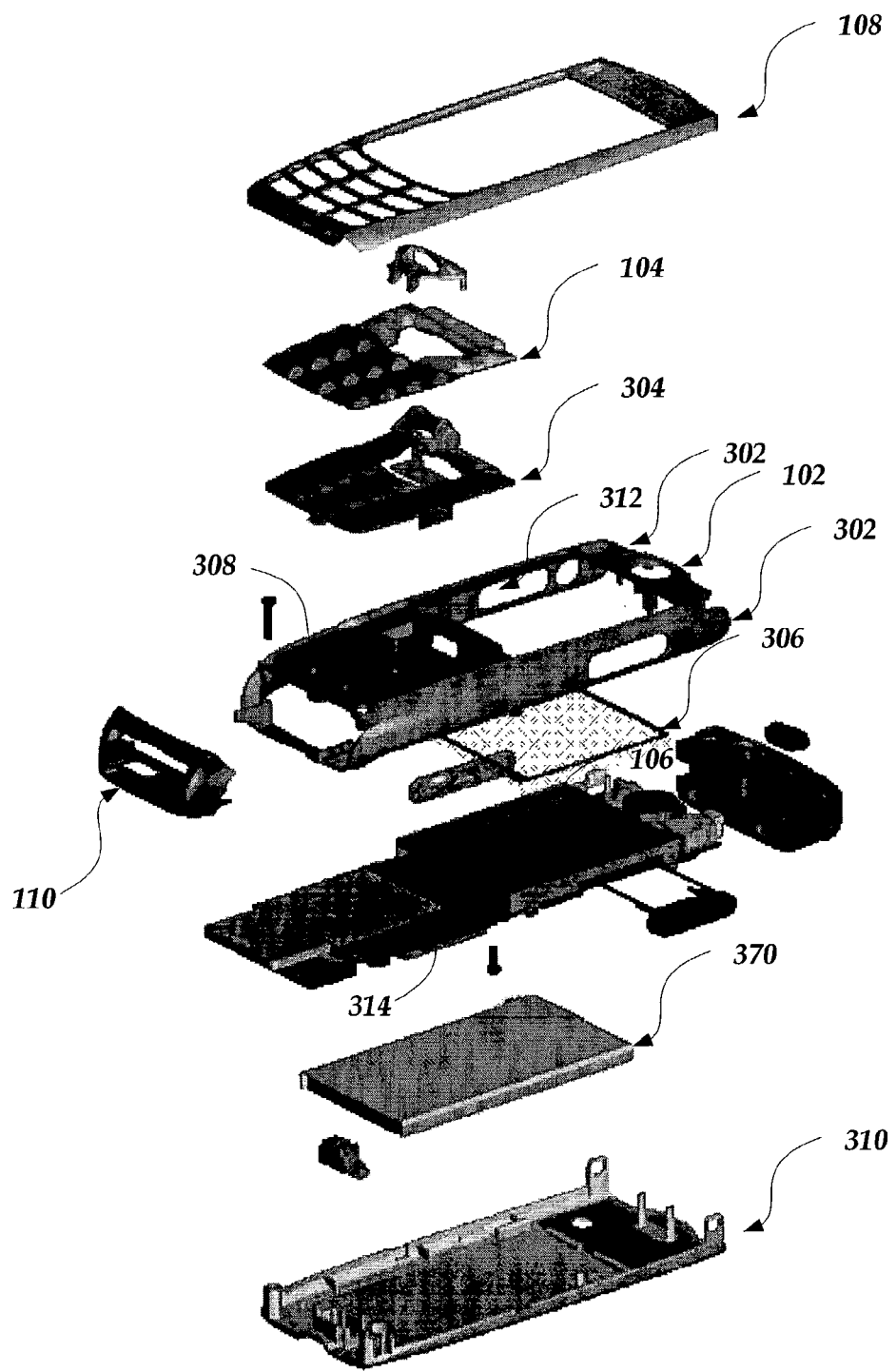
FIG. 3 is an exploded-view diagram generally illustrating components of a system in accordance with the present invention.

FIG. 3 is an exploded-view diagram generally illustrating components of a system 300 in accordance with the present invention. Illustrated generally from front to back are fascia 108, keypad 104, keypad printed circuit board 304, case 102, boot 110, touchscreen 306, display 106, printed circuit board 314, battery 370, and back cover 310. Keypad print circuit board 304 is provided for implementing electronic functions of the mobile device. The components are generally assembled along with the "Z" axis, which allows for easy assembly.

Case 102

Case 102 is typically formed using a material that is generally rigid, lightweight (i.e., less dense), and relatively inexpensive, such as magnesium (although other materials having similar properties may be used). Case 102 can be manufactured using a manufacturing process such as magnesium injection molding. Additionally, case 102 can be formed as a monolithic piece.

Case 102 comprises rigid sidewalls 302. When assembled, the sidewalls extend towards the back of the system 300, such that the peripheral edges of display 106 are surrounded. Sidewalls 302 are arranged to protect the display from shock forces that may occur when, for example, system 300 is dropped. Apertures 312 are provided within sidewalls 302, which provides openings for interface connectors. Apertures 312 are arranged to relieve torque that may occur on a connector that is internal to system 300. Torque can be absorbed by the edges of apertures 312 receiving non-normal forces exerted on an internal connector by for example, a cable being extracted in the direction that is other than outwards from system 300. The interface connectors may be used to supply power, data, and device interfaces to printed circuit board 314.

Case 102 also comprises platform 308. Platform 308 is arranged on the front of case 102 to receive the keypad 104 (and keyboard printed circuit board 304) such that case 102 is interposed between keypad 104 and printed circuit board 314. Platform 308 protects print circuit board 314 from shock forces that might otherwise be transferred through to print circuit board 314 from keypad 104.

Figure 4:
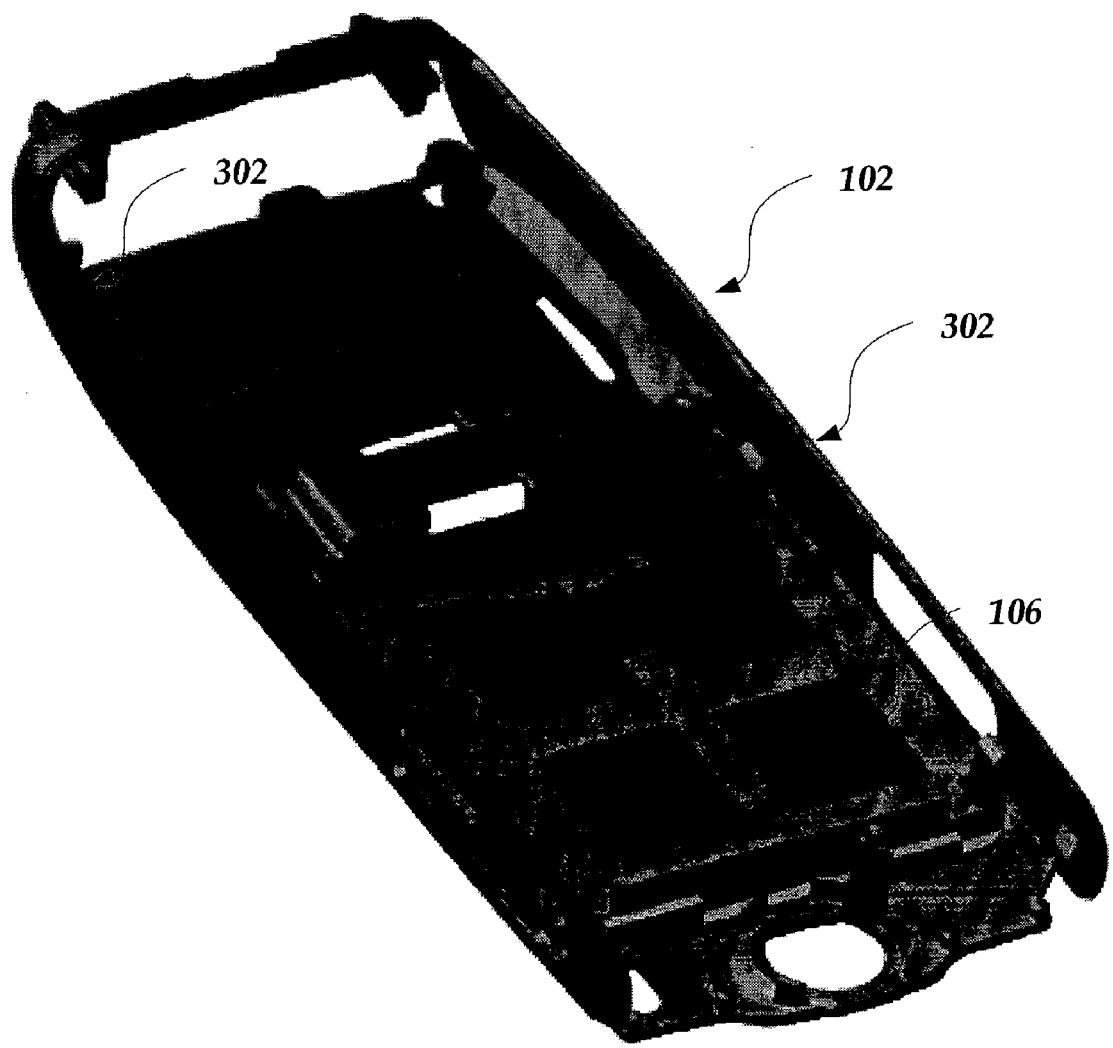
FIG. 4 is a reverse-view diagram generally illustrating an exemplary case and display in accordance with the present invention.

FIG. 4 is a reverse-view diagram generally illustrating an exemplary case and display in accordance with the present invention. As described above, sidewalls 302 of case 102 extend towards the back of the system 300, such that the peripheral edges of display 106 are surrounded. Surrounding the peripheral edges of display 106 protects the display from shock forces that may occur when, for example, system 300 is dropped.

Figure 5:
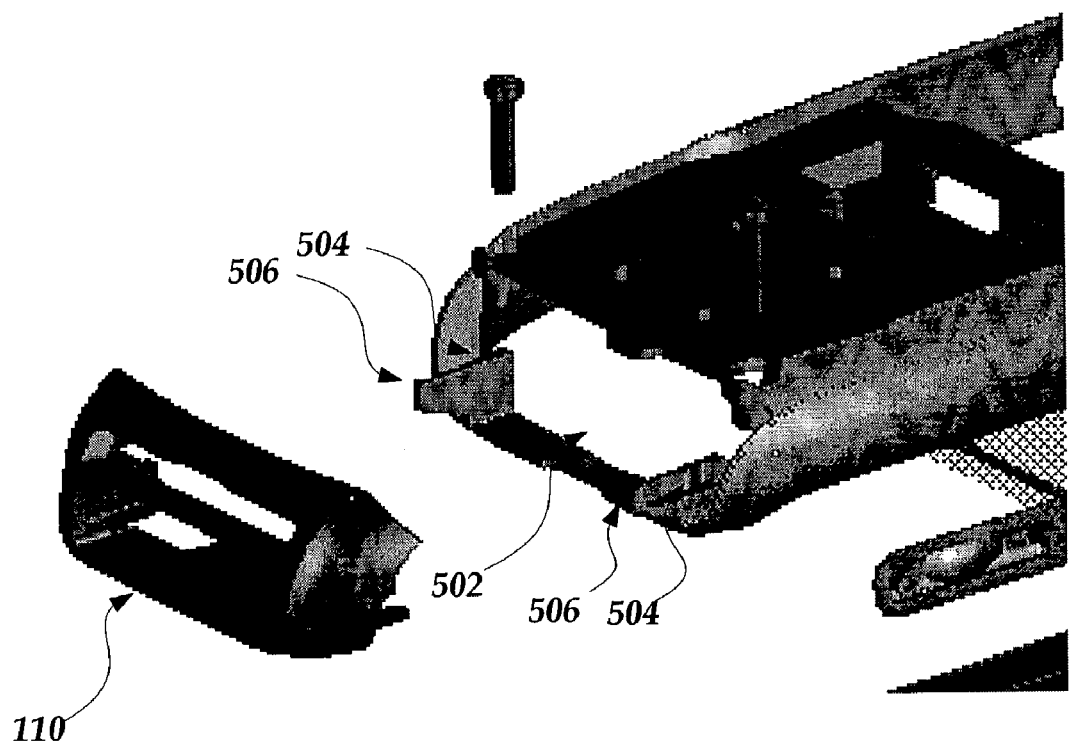
FIG. 5 is a diagram illustrating an exemplary channel and boot in accordance with the present invention.

FIG. 5 is a diagram illustrating an exemplary channel and boot in accordance with the present invention. Case 102 comprises channel 502, which in this example is at the bottom of mobile device 100 (although other locations such as the top or side of case 102 are possible). Channel 502 is configured to slidably receive boot 110.

Channel 502 comprises detent 504 that is configured to secure the boot and closed position at the bottom of case 102 and also comprises detent 506 that is configured to secure the boot in an open position at the bottom of case 102. The first detent is further configured to require a first force to slide the boot from the closed position to the open position and the second detent is further configured to require a second force to slide the boot from the open position to the closed position. To completely remove the boot from case 102, a third force is required that is greater than the first and second forces to slide the boot outwards beyond detent 506.

Boot 110 cooperates with platform 308 to secure keypad 104 (and an associated printed circuit board and fascia) to the case. When boot 110 is in the closed position, keypad 104 is captivated. When boot 110 is in the open position, keypad 104 is released and may be extracted. Likewise, printed circuit board 314 and fascia 108 are captivated when boot 110 is in the closed position and released when boot 110 is in the open position.

Other embodiments of the invention are possible without departing from the spirit and scope of the invention. For example, the display may be mounted via the front of case 102 such that the sidewalls extend frontward and backwards beyond the greatest extent of the display. The above specification, examples, and data provide a complete description of the manufacture and use of the composition of the invention. Since many embodiments of the invention can be made without departing from the spirit and scope of the invention, the invention resides in the claims hereinafter appended.

I claim:

1. A case for a mobile device, comprising:
a back surface that is arranged to receive a printed circuit board and a display;
a plurality of sidewalls that are arranged to enclose a plurality of peripheral edges of a display;
a platform and an opening that are arranged on the front side of the case, wherein the platform is arranged to separate a keyboard and a printed circuit board and the opening is arranged to provide access to the display from the front side of the case; and
a channel within the case that is configured to slidably receive a boot, wherein the channel includes a first detent that is configured to secure the boot in a closed position in the case and a second detent that is configured to secure the boot in an open position in the case, wherein the first detent is further configured to require a first force to slide the boot from the closed position to the open position, the second detent is further configured to require a second force to slide the boot from the open position to the closed position, and the channel is further configured to require a third force that is greater than the first and second forces to slidably remove the boot from the case.

2. The case of claim 1, wherein the platform is further configured to captivate the keypad when the boot is in the closed position and to release the keypad when the boot is in the open position.

3. The case of claim 2, wherein the platform is further configured to captivate a fascia for the keypad when the boot is in the closed position and to release the fascia for the keypad when the boot is in the open position.

4. The case of claim 1, wherein the sidewalls extend rearward a greater distance than the rearward extension of the display.

5. The case of claim 1, wherein the case is comprised of magnesium.

6. The case of claim 1, wherein the case is monolithically manufactured.

7. The case of claim 1, further comprising an aperture that is configured to receive a torque caused by a sideways insertion/extraction of a connector that extends through the aperture.

8. A method for manufacturing a mobile device, comprising:
providing a case having sidewalls, a back side, a front side, a platform that separates the backside from the front side, and an opening from the front side to the backside;
securing a printed circuit board for implementing electronic functions of the mobile device to the back side of a case, wherein the printed circuit board is separated from the front side by the platform;
securing a display within the case such that sidewalls of the case extend around a plurality of the peripheral edges of a display, wherein the opening provides access to the display from the front side;
securing a keypad to the platform such that the platform is interposed between the keypad and the printed circuit board;
sliding a boot into a channel that is within the case;
securing the boot in a closed position in the case by using a first detent;
securing the boot in an open position in the case by using a second detent;
sliding the boot from the closed position to the open position using a first force; and
sliding the boot from the open position to the closed position using a second force, wherein the first and second forces are less than a third force required to slidably remove the boot from the case.

9. The method of claim 8, further comprising captivating the keypad when the boot is in the closed position such that the keypad is released when the boot is in the open position.

10. The method of claim 9, further comprising captivating the fascia when the boot is in the closed position such that the fascia is released when the boot is in the open position.

11. The method of claim 10, further comprising forming the case using magnesium.

12. The method of claim 10, further comprising forming the case as a monolithic piece.

13. The method of claim 10, further comprising forming an aperture in the sidewalls for connectors to be inserted and extracted such that the aperture receives a torque caused by a sideways insertion/extraction of a connector that extends through the aperture.

14. The method of claim 8, wherein the sidewalls extend rearward a greater distance than the rearward extension of the display.

15. A case for a mobile device, comprising:
means for securing a printed circuit board and a display to the back side of a case;
means for securing a display within the case such that sidewalls of the case extend around a plurality of the peripheral edges of a display;
means for securing a keypad to a platform of the case such that the case is interposed between the keypad and the printed circuit board and such that the display is accessible from a front side of the case by an opening in the case;
means for sliding a boot into the case;
means for securing the boot in a closed position in the case by using a first detent;
means for securing the boot in an open position in the case by using a second detent; and
means for requiring a first force for sliding the boot from the closed position to the open, and means for requiring a second force for sliding the boot from the open position to the closed position, wherein the first and second forces are less than a third force required to slidably remove the boot from the case.

16. The case of claim 15, further comprising means for captivating the keypad when the boot is in the closed position and means for releasing the keypad when the boot is in the open position.

17. The case of claim 16, further comprising means for captivating the fascia when the boot is in the closed position and means for releasing the fascia when the boot is in the open position.

18. The case of claim 15, further comprising strain relief means in the sidewalls for connectors to be inserted and extracted such that the strain relief means receives a torque caused by a sideways insertion/extraction of a connector that is mechanically coupled to the printed circuit board.

19. A case for a mobile device, comprising:
- a back surface that is arranged to receive a printed circuit board and a display;
- a plurality of sidewalls that are arranged to enclose a plurality of peripheral edges of a display;
- a platform and an opening that are arranged on the front side of the case, wherein the platform is arranged to separate a keyboard and a printed circuit board and the opening is arranged to provide access to the display from the front side of the case; and
- a channel within the case that is configured to slidably receive a boot, wherein the channel includes a first detent that is configured to secure the boot in a closed position in the case and a second detent that is configured to secure the boot in an open position in the case, wherein the platform is further configured to captivate the keypad when the boot is in the closed position and to release the keypad when the boot is in the open position.

20. The case of claim 19, wherein the platform is further configured to captivate a fascia for the keypad when the boot is in the closed position and to release the fascia for the keypad when the boot is in the open position.

* * * * *